United States Patent [19]

Murrell, Jr. et al.

[11] 4,410,109

[45] Oct. 18, 1983

[54] LEAK DETECTION SYSTEM AND CHECK VALVE FOR USE THEREIN

[75] Inventors: Robert L. Murrell, Jr., Norfolk; Howard J. Murrell, Sr., Virginia Beach, both of Va.

[73] Assignee: Quality Engineering Co., Inc., Virginia Beach, Va.

[21] Appl. No.: 374,787

[22] Filed: May 4, 1982

[51] Int. Cl.[3] ............ B67D 5/32; B67D 5/34; F17D 5/02; F16K 17/00

[52] U.S. Cl. ............ 222/52; 137/469; 137/494

[58] Field of Search ........... 137/469, 494; 222/52

[56] References Cited

U.S. PATENT DOCUMENTS

| | | | |
|---|---|---|---|
| 1,756,566 | 4/1930 | Moody | 137/469 |
| 1,793,019 | 2/1931 | Sawyer | 137/494 X |
| 2,187,768 | 1/1940 | Arquint et al. | 137/494 X |
| 2,216,296 | 10/1940 | Raymond et al. | 137/494 |
| 2,398,089 | 4/1946 | Fehr . | |
| 2,499,527 | 3/1950 | Raymond . | |
| 3,183,723 | 5/1965 | Deters . | |
| 3,439,837 | 4/1969 | Hearn et al. | 222/52 |
| 3,454,195 | 7/1969 | Deters | 222/52 |
| 3,692,050 | 9/1972 | Deters . | |
| 3,817,087 | 10/1972 | Mooney . | |
| 3,940,020 | 2/1976 | McCrory et al. | 222/52 |

Primary Examiner—David A. Scherbel
Attorney, Agent, or Firm—Schwartz, Jeffery, Schwaab, Mack, Blumenthal & Koch

[57] ABSTRACT

The leak detection system includes a leak detection sensor for sensing the pressure of fluid product in a supply line and holding the flow rate of the fluid through the supply line to a value below a maximum when the sensed pressure is below a predetermined value. The sensor is connected to the supply line in proximity to a pump. A pressure responsive valve is connected in the supply line between the sensor and a dispensing nozzle for sensing pressure and stopping the flow of fluid product through the line when the pressure is below a minimum value. The pressure responsive valve allows the line pressure to build to a value sufficient to allow the sensor to complete its sensing cycle and permit full fluid flow.

9 Claims, 6 Drawing Figures

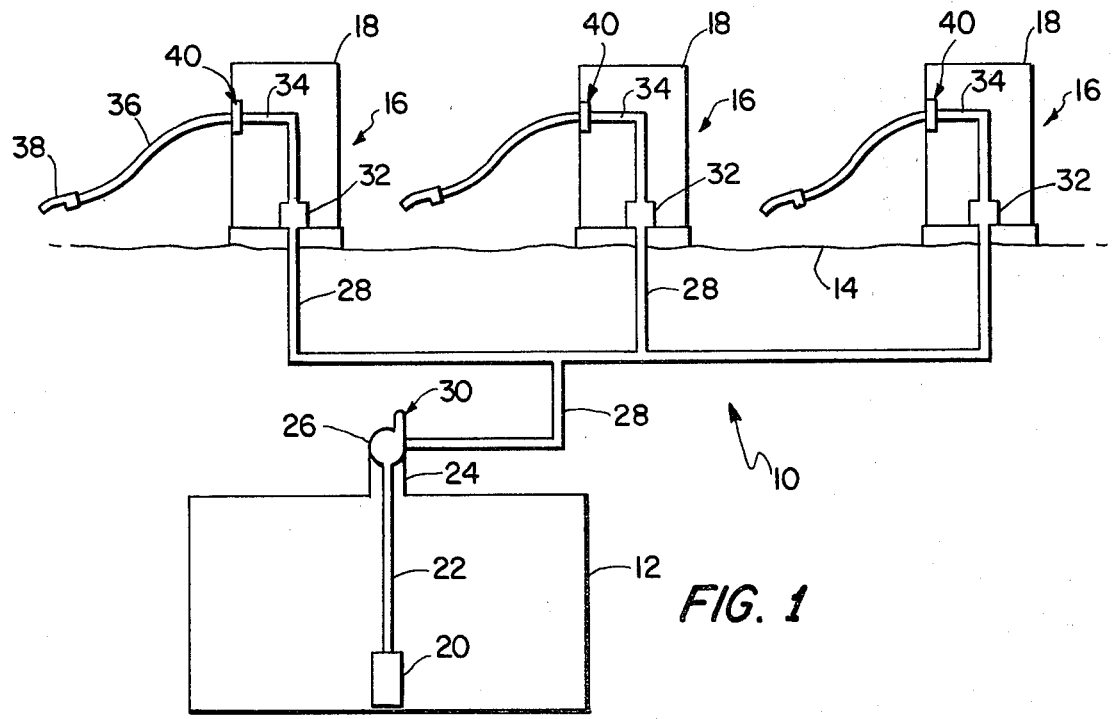
FIG. 1
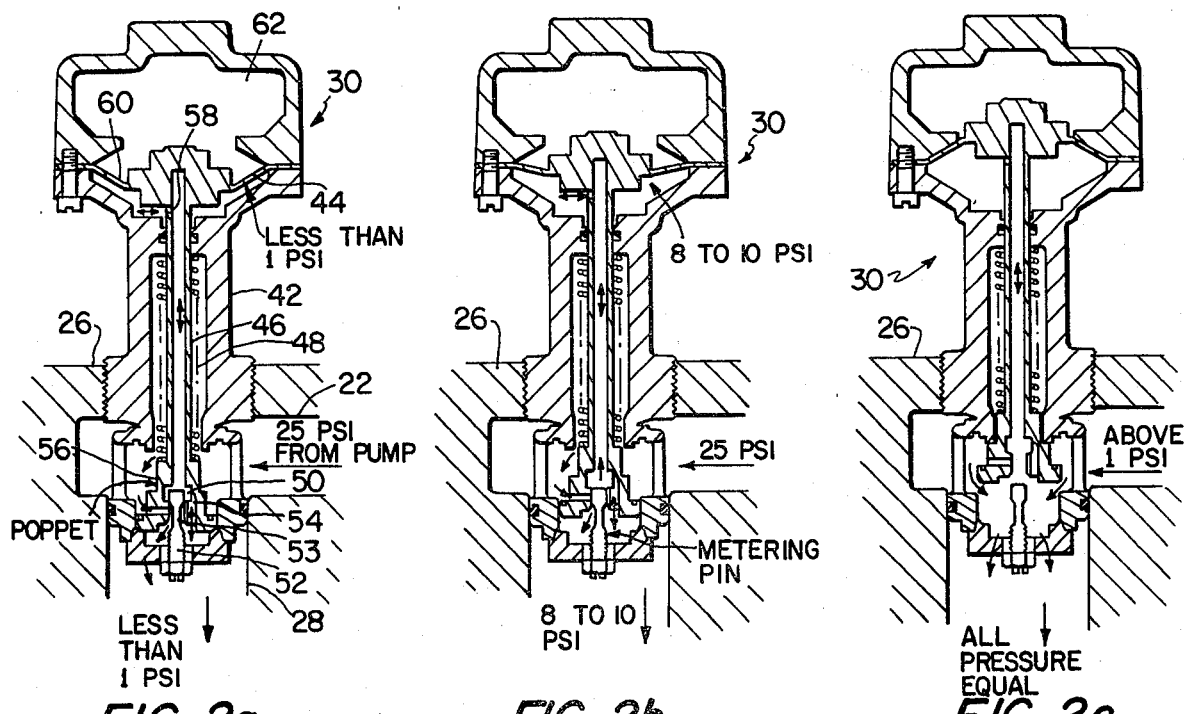
FIG. 2a
(PRIOR ART)
FIG. 2b
(PRIOR ART)
FIG. 2c
(PRIOR ART)

LEAK DETECTION SYSTEM AND CHECK VALVE FOR USE THEREIN

BACKGROUND OF THE INVENTION

This invention relates to leak detection systems for fluid supply lines and more particularly to such systems which employ a pressure sensitive device for indicating leaks and a mechanism for preventing false leak indications.

DISCUSSION OF RELATED ART

The present invention will be discussed in relation to its use in a fuel supply system in a motor vehicle service station. However, it should be understood that the present invention is also adapted for use in other fluid supply systems.

In a conventional service station fuel distribution network, a storage tank for each grade of fuel to be dispensed is disposed beneath ground level. A submersible pump is mounted in the tank and connected by a supply pipe to individual dispensing units contained on islands above the ground surface. Each dispensing unit has a control switch for operating the pump and a control nozzle for opening the dispensing end of the supply line. Due to the large amount of undergound piping which is required to produce such a supply line, the possibility that fuel would leak from the supply line is greatly enhanced. Due to the fact that the supply line is disposed underground, such leaks would not ordinarily be detectable by visual inspection. Consequently, there is a possibility of the ground surrounding the service area becoming saturated with flammable fuel due to a leak thus posing a substantial hazard. Accordingly, a need has arisen for a leak detection system which can function underground.

One solution to the above problem is the use of a pressure sensing, diaphragm operated leak detector valve connected to the pump end of the supply line. When the submerged pump is turned on, a controlled amount of fuel is metered through the detector valve into the supply line. If a leak is present which equals or exceeds this amount, fuel escapes from the supply line at the same rate as it enters. Accordingly, the detector valve assumes a position in which the flow of fuel through the nozzle is greatly below the maximum permissible. This acts as an indication to the operator that a leak is present. If no leaks are present, with the fuel supply nozzle at the distribution end of the supply line closed, pressure rapidly builds in the system and causes the detector valve to open fully thereby allowing the fuel to flow at its full rate when the nozzle is opened. Such a detector valve will be described in greater detail hereinafter and is a commonly available device sold by the Red Jacket Division of Weil-McLain Company, Inc. of Davenport, Iowa, under the name Red Jacket "two second" leak detector.

While the use of a pressure sensing, diaphragm operated leak detector valve has proved effective in providing an indication of fuel leakage, certain difficulties have arisen. These difficulties center around the fact that time is required for the detector valve to test the pressure in the supply line. Such testing may require 3–5 seconds. If the nozzle on the distribution end of the supply line is opened during this period of time, the detector valve will not complete its test and will not reset to its wide open position. Accordingly, flow to a customer waiting to receive fuel will be severely restricted thereby irritating customers and resulting in lost sales of the product being pumped. Additionally, such a pressure sensing detector valve cannot function properly with air or other resiliency present in the supply line. Consequently, such air must be purged from the system before the detector valve test sequence is conducted.

SUMMARY OF THE INVENTION

An object of the present invention is to provide a leak detection system which overcomes the deficiencies discussed above.

Another object of the present invention is to provide a leak detection system which incorporates a pressure sensitive leak detector valve and also comprises a pressure responsive valve designed to be compatible with the leak detector valve, which pressure responsive valve can be installed at the nozzle end of the supply line. In this manner, leak detection systems utilizing standard leak detector valves can be easily upgraded by simply adding a pressure responsive valve according to the present invention.

Another object of the present invention is to provide a pressure responsive valve for use in a fluid detection system, which valve acts to prevent the backflow of fluid through the supply line due to leakage back past the standard system check valve in a submersible pump of the system.

Another object of the present invention is to provide a leak detection system having a pressure responsive valve which allows backflow of fluid through itself in the event of an inordinate increase in pressure of fluid at the valve outlet.

In accordance with the above and other objects, the present invention comprises a leak detection system for use in a fluid supply system wherein the fluid supply system has a liquid product storage tank, a pump disposed proximate to the tank for pumping the product from the tank, a supply line having one end connected to the pump and a second end connected to a supply nozzle, which nozzle includes a valve for opening and closing the nozzle. The leak detection system comprises a sensor which senses the pressure of the product in the supply line and holds the flow rate of the product through the supply line to a value below a maximum value when the sensed pressure is below a predetermined minimum value. The sensor is connected in the supply line in proximity to the pump. A check valve is connected in the supply line between the sensor and the nozzle. The pressure responsive valve senses pressure in the supply line and stops the flow of the product through the supply line when the sensed pressure is below a predetermined value.

In accordance with other features of the invention, the pressure responsive valve comprises a two stage valve having an inlet and an outlet. A valve member, which can be opened and closed, is disposed in the valve between the inlet and outlet. A first control surface is in communication with the inlet and is operatively connected to the valve member for opening the valve member in response to pressure from the product received through the inlet. A second control surface is in contact with the valve member and has a greater surface area than that of the first control surface. The second control surface is disposed to receive product passing through the valve member and is responsive to the pressure thereof for fully opening and maintaining the valve member open even if the pressure drops below the predetermined value.

In accordance with other aspects of the invention, the first control surface comprises a surface of the valve member itself. The second control surface comprises a diaphragm which communicates with the valve member through a control shaft. The diaphragm communicates with the outlet so that any fluid pressure in the outlet is felt by the diaphragm, which will open the valve member when the pressure becomes excessive.

In accordance with other aspects of the invention, the leak detecting sensor comprises a pressure sensitive leak detector valve having a first position in which the product is allowed to flow through the valve at a first rate in response to a first pressure sensed in the supply line, a second position in which the product is allowed to flow at a second rate in response to a second pressure in the supply line, and a third position in which the product is allowed to flow at a third rate in response to a third pressure in the supply line.

BRIEF DESCRIPTION OF THE DRAWINGS

FIG. 1 is a diagrammatical view showing a service station fuel supply line system incorporating the leak detection system of the present invention;

FIGS. 2a, 2b and 2c diagrammatically show the three positions of the prior art leak detector valve used in the system of the present invention;

DESCRIPTION OF THE PREFERRED EMBODIMENT

Figure 3:
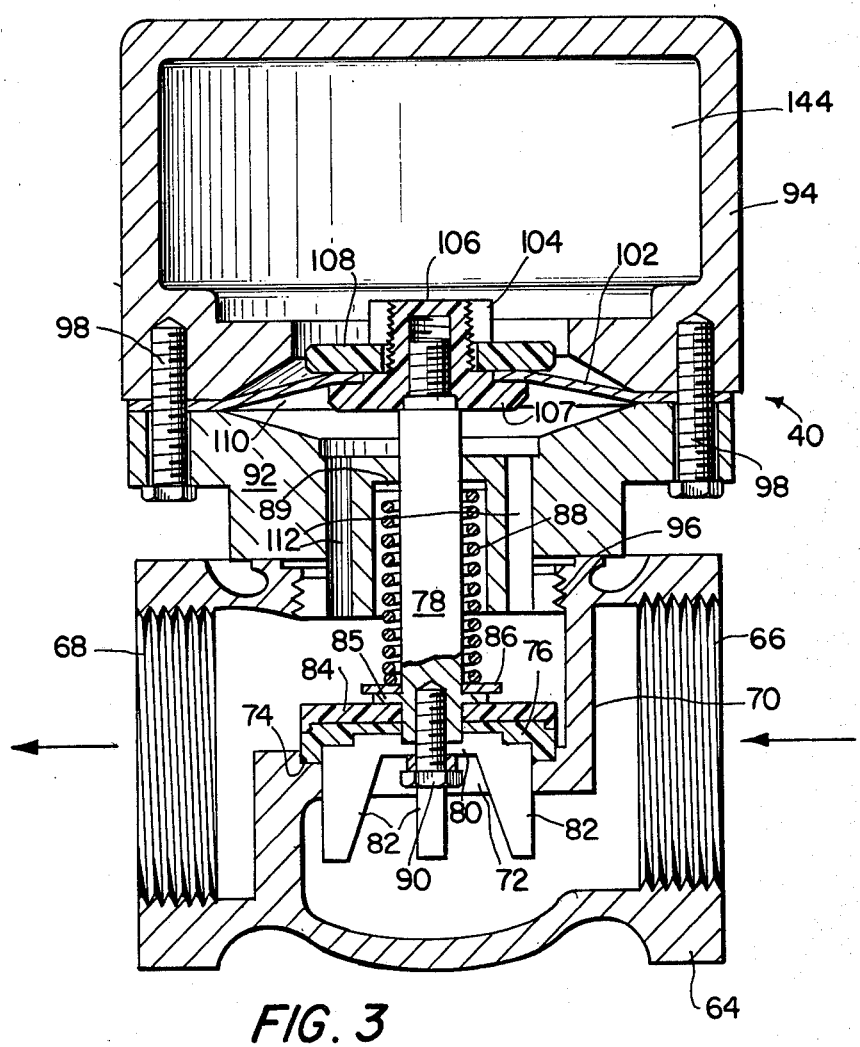
FIG. 3 is an elevational sectional view showing the two stage pressure responsive valve of the present invention.

FIG. 1 is a diagrammatical view showing a typical motor vehicle service station fuel distribution network incorporating the leak detection system of the present invention. It will be understood that, while a fuel distribution network for a service station is being shown, the leak detection system could just as easily be used in any other liquid distributing network.

Fuel delivery system 10 includes a storge tank 12 which is disposed beneath the surface of the ground 14. Tank 12 stores a single grade of fuel and, normally, a plurality of such tanks are provided at a given installation in order to allow various grade fuels to be dispensed. The fuels are dispensed at any one of a plurality of islands 16 which contain one or more product dispensers 18.

Fuel from tank 12 is pumped by submersible pump 20 through line 22 and cap 26 to supply line 28. Cap 26 normally is mounted on a bushing 24 contained on the tank. In normal circumstances, cap 26 is accessible from ground level. Leak detector valve 30 is mounted on cap 26 and disposed to receive fluid from pipe 22 passing to line 28. Detector valve 30 will be described in greater detail hereinafter.

Fuel passing through line 28 enters dispenser 18 and passes through filter 32. From filter 32, the fuel passes through the internal piping network 34 of the dispenser into dispensing hose 36 and nozzle 38. While not shown in detail in the drawings, it will be understood that dispenser 18 is a typical motor vehicle fuel dispenser having a price indicator and volume indicator visible to a station attendant and customer. The normal flow meter and other equipment are contained in dispenser 18 and connected to line 34 in a manner conventional in the art. This equipment includes a switch for starting and stopping the operation of pump 20. Also, it will be understood that nozzle 38 is a standard nozzle found on fuel dispensers and contains a manually operated on/off valve for starting and stopping the flow of fuel through the nozzle to the tank of an automotive vehicle. Two stage pressure responsive valve 40 is connected to the junction between line 34 and line 36. It should also be understood that a separate two stage check valve 40 must be used with each dispensing unit 18. On the other hand, only one leak detector valve 30 is necessary for each pump 20.

FIGS. 2a, 2b and 2c show the construction of leak detector valve 30. As discussed above, leak detector valve 30 is a conventionally available pressure sensitive, diaphragm operated valve. Detector valve 30 comprises a housing 42 containing a diaphragm 44 which is connected to the upper end of a hollow shaft 46. Shaft 46 is biased downwardly to force the valve to its closed position by spring 48. The lower portion of shaft 48 is enlarged and contains a chamber 50. Metering pin 52 has a head which may extend into chamber 50 from below and has a diameter which is slightly less than the internal diameter of shaft 46 so that a small amount of fluid can flow past the pin. Pin 52 also contains a recessed portion 53 below the head to let a greater amount of fluid flow past.

FIG. 2a shows the relaxed position of the leak detector valve. Under normal conditions, line 22 from pump 20 is filled with fuel and connected to the inlet of the leak detector. Line 28 is connected to the outlet of the leak detector and is also filled with fuel. When the pressure in line 28 is less than 1 PSI, diaphragm 44 is in its down or "tripped" position and shaft 46 is moved downwardly so that the head of metering pin 52 is disposed in chamber 50. In this position, when the pump is started, fluid flows through channel 56 and through the bypass formed by recessed portion 53 of valve 52 into the outlet connected to line 28 at a rate of approximately 1½ gallons per minute. Fluid is also permitted to pass at a slow rate upwardly past the head of pin 52 and out opening 58 into diaghragm chamber 60. However, when the fluid pressure is less than 1 PSI, insufficient force is generated to overcome the bias of spring 48.

If no leaks are present, when the system is full, pressure builds rapidly moving shaft 46 upwardly to the leak sensing position shown in FIG. 2b. When the pressure builds to approximately 8 to 10 PSI, shaft 46 moves up to a point where flow past the recess 53 is almost stopped completely. At this point, fluid flow occurs past the top of pin 52 and out channel 54 as well as into diaphragm chamber 60. In this position, flow is limited to approximately 3 gallons per hour by metering pin 52. If a leak exists in the system, and the loss due to the leak equals or exceeds three gallons per hour, the line pressure will not build beyond this point and the device will remain in the leak sensing position with the main flow blocked. If the dispensing nozzle of the system is open at this time, the line pressure will drop, and diaphragm 44 will respond and shaft 46 will return to the position shown in FIG. 2a. If there is no leak in the system, the flow upward past the metering pin increases the line pressure to 10 PSI in approximately two seconds at which pressure diaphragm 44 will snap the valve to the fully opened position shown in FIG. 2c. In the position of FIG. 2c, the valve allows full flow of fluid. The valve will remain in this position as long as the system pressure remains above 1 PSI. At less than 1 PSI, the valve will return to the position shown in FIG. 2a.

Operation of valve 30 is dependent upon nozzle 38 being closed during the test sequence. If nozzle 38 is opened prior to the test sequence being finished, detector valve 30 returns to the position of FIG. 2a and the fluid will never be dispensed at a rate greater than 1½ gallons per minute. If a nozzle 38 is opened prior to the test sequence being completed, it may be possible to close the nozzle and reopen it after a new test sequence. However, when a plurality of nozzles are fed by a single pump, as in FIG. 1, all of the nozzles must be closed simultaneously in order to ensure proper operation of the leak detector.

Futhermore, detector 30 requires that an incompressible fluid be used in order for the test sequence to be completed in approximately two seconds. Consequently, if air is in the line, this air must be compressed before detector valve 30 will reach the full flow position of FIG. 2c. Consequently, the probability of a nozzle being opened prior to the test sequence being completed is extremely high.

In order to overcome these problems, pressure responsive valve 40, shown in FIG. 3, is inserted in the supply line at the nozzle end of the line. Valve 40 is a two stage pressure responsive valve which initially opens in response to pressure which is greater than approximately 10 PSI and then instantly pops to its fully open position to allow free flow of fluid and remains open even if the pressure falls below 10 PSI.

As shown in FIG. 3, valve 40 comprises a standard valve body 64 having a threaded inlet port 66 for connection to line 34 and a threaded outlet port 68 for connection to supply hose 36. A dividing wall 70 is contained within the valve body and separates the valve body between the inlet and outlet ports. A valve opening 72 is contained in wall 70 and allows passage of fluid therethrough when the valve is opened. Wall 70 contains a valve seat 74 around its upper periphery. Seat 74 receives valve plunger 76 when the valve is closed. Valve plunger 76 is disk shaped and is mounted to control shaft 78. A guide member 80 is also mounted to the control shaft and contains fingers 82 which contact the inner periphery of opening 74 and guide the movement of shaft 78 and valve plunger 76 so that the valve plunger will be properly received in seat 74, when the valve is closed. A spacer 84 is also mounted to control shaft 78 and contacts valve plunger 76 and helps the valve plunger keep its shape. Spacer 84 is generally disk shaped with a central opening which slides over control shaft 78. Spacer 84 abuts boss 85 which is formed on the control shaft. Spacer 84 may be made of any non-corrosive durable material, such as synthetic resin, or brass. Valve plunger 76 should be formed of a durable, non-corrosive material such as a synthetic resin which is also pliable so that it will form a good seal against the valve seat 74. Valve plunger 76 also has a central opening which slides over control shaft 78. Guide member 80 is forced against the bottom of shaft 78 by bolt 90. Bolt 90 extends through a washer and guide element 80 and is received in a threaded opening in shaft 78 to hold all of the aforementioned elements on the shaft.

A washer 86 rests on the upper portion of boss 85 and receives the lower surface of compression spring 88. Compression spring 88 extends upwardly coaxially with shaft 78 and abuts a second washer 89. Washer 89 is received in an opening in intermediate housing 92. Housing 92 is threadedly connected to valve body 64 by threaded connection 96. Intermediate housing 92 is attached to housing cap 94 to complete the valve housing. The connection to cap 94 is effected by bolts 98 which pass through intermediate housing 92 and are received in threaded openings in cap 94.

A diaphragm 102 is connected between the top of shaft 78 and the attachment point of intermediate housing 92 to cap 94. The outer periphery of diaphragm 102 is pressed between the outer edge of intermediate housing 92 and the outer edge of cap 94 by pressure from bolts 98. In this manner, an air tight seal is formed. The inner periphery of diaphragm 102 is attached to a mounting structure comprising cap member 106 which has an inner threaded surface mounted to the threaded end of shaft 108. Cap member 106 has a flange 107 which supports diaphragm 102 from beneath. A washer 108 is placed over cap member 106 and rests on flange 107. A nut 104 is received on external threads of cap member 106 and forces washer 108 down onto flange 107 thus wedging diaphragm 102 therebetween. Diaphragm 102 mounted in this manner forms a diaphragm chamber 110 below it. Diaphragm chamber 110 communicates through holes 112, which are drilled in intermediate body 92, with outlet port 68. Above diaphragm 102 is an air tight chamber 114 which acts as a reaction chamber when shaft 78 and diaphragm 102 move upwardly.

In operation, it will be seen that fluid flows into inlet 66 and contacts the lower surface of the valving mechanism comprising plunger 76, guide member 80 and valve seat 76. The pressure of the fluid acts against the force of spring 88 which is set to require a pressure of approximately 10 PSI before valve plunger 76 can be moved from seat 74. When the fluid pressure reaches this value, shaft 78 moves upwardly lifting valve plunger 76 from seat 74. The fluid which passes valve plunger 76 flows through outlet 68 and through holes 112 into diaphragm chamber 110. Accordingly, fluid pressure in diaphragm chamber 110 immediately builds to force the diaphragm upwardly. Diaphragm 110 has a larger surface area than the exposed portion of the valving mechanism. Accordingly, the pressure within diaphragm chamber 110 will cause shaft 78 to rapidly open the valve mechanism fully thus allowing full fluid flow through the valve. Diaphragm 102 will hold the valving mechanism open even when the fluid pressure drops below 10 PSI. The pressure at which the diaphragm allows the valve to close can be made to be approximately 4 PSI, equal to the pressure for tripping the leak detector valve 30.

The operation of the system of FIG. 1 containing valve 40 should now be readily apparent in view of the above discussions. However, in order to avoid any confusion as to such operation, a detailed discussion of the operation will now be set forth with reference to FIGS. 1, 2 and 3.

Initially, it will be assumed that lines 22, 28, 34 and 36 are filled with fuel to be dispensed. Pump 20 is started and the pressure in line 22 builds to approximately 25 psi. At this point, the pressure in line 28 and, thus, leak detector 30 and check valve 40 is initially at or below 1 PSI. Accordingly, pressure responsive valve 40 will not open and the pressure builds rapidly in the system. If, at this time, nozzle 38 is open, little or no fuel will be dispersed.

As the pressure in the system continues to rise, leak detector 30 assumes the position shown in FIG. 2b when the output pressure reaches 8 to 10 PSI. The flow rate at this point is 3 gallons per hour. However, the pressure in the system is still not sufficient to open pressure responsive valve 40 regardless of the condition of nozzle 38.

When the pressure produced by pump 20 finally reaches 10 PSI, leak detector 30 fully opens, as shown in FIG. 2c, and full flow of fuel is permitted. Approximately at the same time, valve member 76 is lifted from seat 74 in valve 40 and fuel is allowed to flow through openings 112 to diaphragm chamber 110 causing pressure responsive valve 40 to pop open thus allowing full flow of fuel to nozzle 38. At this time, if nozzle 38 is already opened, fuel will flow at its maximum rate to the tank of a vehicle in which the nozzle is inserted. Otherwise, the pressure in the entire system to the nozzle 38 will build to its maximum and the system will be ready to supply the fuel at a maximum rate as soon as the nozzle is opened.

If a leak is present which equals or exceeds three gallons per hour, the pressure in the system will never rise sufficiently to move the leak detector beyond the position shown in FIG. 2b. Also, the pressure will not rise sufficiently to open pressure responsive valve 40. Accordingly, no fuel will be dispensed. If there is a leak in the system which is less than three gallons per hour, the leak detector will take longer than two seconds to open completely. Also, check valve 40 will remain closed for over two seconds. This extended time delay will notify the operator of a small leak in the system. If no leak exists in the system, in approximately two seconds, leak detector 30 and pressure responsive valve 40 will open fully delivering maximum fuel flow to the nozzle.

Once pressure responsive valve 40 has been opened, diaphragm 102 will maintain the valve in the open position even if the pressure in the line falls below 10 PSI. Accordingly, if additional dispenser nozzles 38 are opened, the pressure responsive valve will not close. Also, if the pressure in the system remains sufficiently high, the pressure responsive valve will not close between sequential operations of the associated nozzle 38.

When the system has been shut off for any length of time and pressure has dropped sufficiently to allow pressure responsive valve 40 to close, pressure in hose 36 may build due to solar radiation, or the like. When this pressure is created in outlet port 68 of the pressure responsive valve, it will react against diaphragm 102 and thus open the pressure responsive valve to allow backflow through valve body 64 into the lower pressure system on the inlet system of the pressure responsive valve. Accordingly, excessive pressure in hose 36 will be relieved.

The pressure responsive valve is also useful when air is trapped in the system. With the pressure responsive valve, the compression of the trapped air to a sufficient amount to allow leak detector 30 to open fully will be ensured.

Another problem encountered with systems not using pressure responsive valve 40 is that if a check valve associated with pump 20 contains poor seals, fuel may flow backward from hose 36, line 34, line 28 and line 22 into tank 12 when pump 20 is dormant. This increases the amount of time it takes to distribute fuel through nozzles 38 when pump 20 is again started. With pressure responsive valve 40 in the system, no air can enter the line through nozzle 38 and, thus, such backflow will be prevented.

Figure 4:
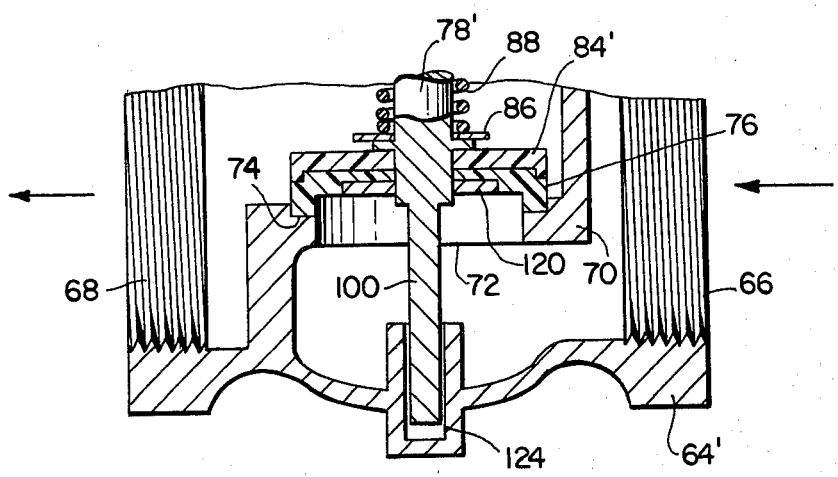
FIG. 4 is a fragmental view of the two stage check valve showing an alternate structure for the valve guide.

The configuration of pressure responsive valve 40 can be altered to suit different conditions. For example, FIG. 4 shows a modification of the structure for guiding valve plunger 76 onto valve seat 74. For check valves of small configuration, the fingers 82 of valve 40 can be overly cumbersome and restrict flow through the valve opening. Accordingly, with the valve shown in FIG. 4, the guide structure comprises a pin 122 which is integral with shaft 78'. Pin 122 is received in an opening 124 formed in the base of valve body 64. Shaft 78' is formed the same as shaft 78 except that spacer 84' is formed integrally with the shaft rather than as a separate component which is slid on the shaft as is the case with spacer 84 of valve 40. The other components of the valve are the same except that a washer 120 is used to hold valve member 76 in place. Washer 12 is press fit on shaft 78'.

It will be understood that the invention is capable of still further modifications, additions or other changes and that this application is intended to cover any such variations, other uses, or adaptations of the invention which follow the general principles of the invention and include such departures from the disclosure as come within the knowledge or customary practice in the art to which the invention pertains, and which may be applied to the essential features hereinbefore set forth and fall within the scope of the invention or limits of the appended claims.

What is claimed is:

1. In a fluid supply system having a liquid product storage tank, a pump disposed proximate to said tank for pumping product from the tank, a supply line having one end connected to said pump and a second end connected to a supply nozzle having valve contained therein for opening and closing said nozzle, a leak detection system, comprising:
   a leak detection sensor means for sensing the pressure of product in said supply line and holding the flow rate of product through said supply line to a value below a maximum when said sensed pressure is below a first minimum value, said sensor means being connected to said supply line in proximity to said pump; and
   pressure responsive valve means connected to said supply line between said sensor means and said nozzle for sensing said pressure and holding said supply line closed until said pressure increases to a second minimum value, said second minimum value being at least as great as said first minimum value.

2. The leak detection system as set forth in claim 1, wherein said fluid supply system is a liquid fuel supply system in a motor vehicle service station.

3. The leak detection system as set forth in claim 1, wherein said leak detection sensor means is a pressure sensitive valve having a first position allowing said product to flow at a first rate in response to a first pressure sensed in said supply line, a second position allowing said product to flow at a second rate in response to a second pressure in said supply line, and a third position allowing said product to flow at a third rate in response to a third pressure in said supply line.

4. The leak detection system as set forth in claim 1, wherein said supply line is connected to a plurality of supply nozzles, and wherein a similar pressure responsive valve means is connected between each nozzle and said leak detector.

5. In a fluid supply system having a liquid product storage tank, a pump disposed proximate to said tank for pumping product from the tank, a supply line having one end connected to said pump and a second end connected to a supply nozzle having a valve contained therein for opening and closing said nozzle, a leak detection system, comprising:
   a leak detection sensor means for sensing the pressure of product in said supply line and holding the flow rate of product through said supply line to a value below a maximum when said sensed pressure is below a first minimum value, said sensor means being connected to said supply line in proximity to said pump;
   pressure responsive valve means connected in said supply line between said sensor means and said nozzle for sensing said pressure and stopping the flow of said product through said line past said pressure responsive valve means when said pressure is below a second minimum value; and
   wherein said pressure responsive valve means comprises a two stage valve having a housing with an inlet and an outlet, a valve mechanism which can be opened and closed, disposed in the housing between the inlet and the outlet, a first control surface in communication with said inlet and operatively connected to said valve mechanism for opening said valve mechanism an initial amount in response to pressure from product received through said inlet, and a second control surface in contact with said valve mechanism, said second control surface having a surface area greater than that of said first control surface and being disposed to receive product passing said valve mechanism and being responsive thereto for fully opening said valve mechanism.

6. The leak detection system as set forth in claim 5, wherein said first control surface is a surface of said valve mechanism.

7. The leak detection system as set forth in claim 6, wherein said second control surface is a diaphragm.

8. The leak detection system as set forth in claim 5, wherein said second control surface is disposed in communication with said outlet whereby said second control surface is responsive to excessive pressure in said outlet for opening said valve member and permitting reverse flow of product through said supply line.

9. The leak detection system as set forth in claim 5, wherein said valve mechanism includes a valve seat and a plunger, said plunger being biased toward said seat by a spring mounted on a control shaft, said control shaft being mounted to said plunger.

* * * * *